US012395921B2

(12) United States Patent
Zhang et al.

(10) Patent No.: US 12,395,921 B2
(45) Date of Patent: Aug. 19, 2025

(54) METHOD FOR SENDING AND RECEIVING SYSTEM MESSAGE, BASE STATION, AND USER EQUIPMENT

(71) Applicant: SHARP KABUSHIKI KAISHA, Osaka (JP)

(72) Inventors: Chongming Zhang, Shanghai (CN); Fangying Xiao, Shanghai (CN); Shohei Yamada, Osaka (JP); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 22 days.

(21) Appl. No.: 16/317,669

(22) PCT Filed: Jul. 14, 2017

(86) PCT No.: PCT/CN2017/092957
§ 371 (c)(1),
(2) Date: Jan. 14, 2019

(87) PCT Pub. No.: WO2018/010694
PCT Pub. Date: Jan. 18, 2018

(65) Prior Publication Data
US 2019/0349840 A1    Nov. 14, 2019

(30) Foreign Application Priority Data
Jul. 15, 2016  (CN) .......................... 201610561233.8

(51) Int. Cl.
*H04W 48/10* (2009.01)
*H04L 5/00* (2006.01)
*H04W 76/18* (2018.01)

(52) U.S. Cl.
CPC ............. *H04W 48/10* (2013.01); *H04L 5/005* (2013.01); *H04L 5/0053* (2013.01); *H04W 76/18* (2018.02)

(58) Field of Classification Search
None
See application file for complete search history.

(56) References Cited

U.S. PATENT DOCUMENTS 8,368,530 B1 *  2/2013  Zhang .................... H04W 4/90
340/539.11
2009/0239498 A1  9/2009  Lee et al.
(Continued)

FOREIGN PATENT DOCUMENTS

CN    101686092 A    3/2010
CN    101978713 A    2/2011
(Continued)

OTHER PUBLICATIONS

Interdigital Communications, "System Information Acquisition for New Radio Access", R2-164088, 3GPP TSG-RAN WG2 #94 Nanjing, China, May 23-27, 2016.
(Continued)

*Primary Examiner* — Huy D Vu
*Assistant Examiner* — Bao G Nguyen
(74) *Attorney, Agent, or Firm* — ScienBiziP, P.C.

(57) ABSTRACT

The present application provides a method executed by a user equipment, comprising: receiving a first system information (SI) message, wherein the first system information (SI) message comprises type information related to a system information block (SIB) and scheduling information of a second system information (SI) message to which the type of the SIB belongs, and the scheduling information comprises a time when the second SI message appears and indication information indicating whether the second SI
(Continued)

message is broadcast; and if the indication information indicates that the second SI message is not broadcast, sending an SI request message, and receiving a needed system information block (SIB) according to the scheduling information in the received first SI message. The present application further provides a corresponding user equipment and base station. By means of the present invention, unnecessary overheads are avoided and system resources are saved while meeting the demand of a UE acquiring information.

8 Claims, 4 Drawing Sheets

(56) References Cited

U.S. PATENT DOCUMENTS

| | | | |
|---|---|---|---|
| 2009/0251315 A1 | 10/2009 | Lee et al. | |
| 2009/0253401 A1 | 10/2009 | Lee et al. | |
| 2011/0045796 A1 | 2/2011 | Lee et al. | |
| 2011/0171929 A1* | 7/2011 | Tamura | H04W 48/12 455/404.1 |
| 2012/0093095 A1* | 4/2012 | Barbieri | H04W 72/0426 370/329 |
| 2012/0250501 A1* | 10/2012 | Lee | H04W 4/90 370/229 |
| 2012/0276933 A1 | 11/2012 | Laitinen | |
| 2013/0094424 A1 | 4/2013 | Dhanda et al. | |
| 2015/0038228 A1 | 2/2015 | Howson | |
| 2015/0304989 A1* | 10/2015 | Zhu | H04L 1/0047 370/252 |
| 2016/0088424 A1* | 3/2016 | Polo | H04W 88/04 455/41.1 |
| 2017/0251500 A1* | 8/2017 | Agiwal | H04W 72/0413 |
| 2017/0280382 A1* | 9/2017 | Radulescu | H04W 74/0833 |
| 2017/0318478 A1* | 11/2017 | Basu Mallick | H04L 5/0069 |
| 2018/0132165 A1* | 5/2018 | Takahashi | H04W 48/10 |

FOREIGN PATENT DOCUMENTS

| | | |
|---|---|---|
| CN | 103179513 A | 6/2013 |
| CN | 103702394 A | 4/2014 |
| CN | 103813271 A | 5/2014 |
| CN | 103888964 A | 6/2014 |
| EP | 1887822 A1 | 2/2008 |
| WO | 2014/129951 A1 | 8/2014 |
| WO | 2014/169867 A1 | 10/2014 |
| WO | 2016036463 A1 | 3/2016 |

OTHER PUBLICATIONS

NEC, "System information on demand in standalone NR", R2-163980, 3GPP TSG RAN WG2 Meeting #94 Nanjing, China, May 23-27, 2016.
3rd Generation Partnership Project; Technical Specification Group Radio Access Network; Evolved Universal Terrestrial Radio Access (E-UTRA); Radio Resource Control (RRC); Protocol specification (Release 13), 3GPP TS 36.331 V13.2.0 (Jun. 2016).
U.S. Appl. No. 62/334,706, filed May 11, 2016.
NTT Docomo, "New SID Proposal: Study on New Radio Access Technology", 3GPP TSG RAN Meeting #71 RP-160671 Goteborg, Sweden, Mar. 7-10, 2016.
CATT, System information in NR, 3GPP TSG RAN WG2 Meeting #94 R2-163470, May 14, 2016(May 14, 2016).

* cited by examiner

METHOD FOR SENDING AND RECEIVING SYSTEM MESSAGE, BASE STATION, AND USER EQUIPMENT

TECHNICAL FIELD

The present invention relates to the field of wireless communications technology. More specifically, the present invention relates to a method for sending and receiving a system message, and a corresponding base station and user equipment.

BACKGROUND

With the rapid growth of mobile communication and great progress of technology, the world will move toward a fully interconnected network society where anyone or anything can acquire information and share data anytime and anywhere. It is estimated that there will be 50 billion interconnected equipment by 2020, of which only about 10 billion may be mobile phones and tablet computers. The rest are not machines communicating with human beings but machines communicating with one another. Therefore, how to design a system to better support the Internet of Everything is a subject needing further and intensive study.

For this purpose, at the Third Generation Partnership Project (3GPP) RAN#64. plenary session held in March 2016, a research subject on new 5G radio access technology was proposed (see non-patent literature: RP-160671 New SID Proposal: Study on New Radio Access Technology). In the description of the work item, the operating frequency band of future new communication RATs can be expanded to 100 GHz, which will satisfy at least service requirements for enhanced mobile broadband, the demand for communication between a large number of Internet of Things terminals, service requirements of high reliability requirements, and so on. The research work of the item is expected to end in 2018.

For better energy conservation and emission reduction, the initial requirement of the item is to avoid the network repeatedly sending of unnecessary information. This requirement is based on the following consideration:

In an existing LTE system, in order to ensure normal access of an LTE user equipment (UE), a base station (eNB) periodically broadcasts access stratum and non-access stratum information, which is collectively referred to as system information. in a current LTE system, system information is divided into one master system information block (MIB) and several system information blocks (SIBs) for carrying different content; the SIBs may have up to 20 types.

The MIB carries the necessary and most frequently sent parameters for acquiring basic information of a cell; and SIB1 includes scheduling information for other SIBs. Thus, MIB and SIB1 are system information that the UE must receive. Other than MIB and SIB1, not all the other SIBs need to be broadcast. According to the features supported by a current access network device and the features of the non-access stratum, the eNB selects a system information block relevant to the features for broadcast. For example, if the current access network supports enhanced access control, the eNB broadcasts SIB14, which carries relevant information of EAB; otherwise, broadcasting is not performed. If the current access network supports a multimedia broadcast multicast service (MBMS), the eNB broadcasts SIB13 and so on. Such broadcast information is all reflected in the scheduling information carried by SIB1. Unscheduled SIBs are not broadcast.

The system information broadcast by the eNB is sent periodically. Except that MIB and SIB1 are independently sent, SIBS having the same period are arranged in the same system information message and are sent periodically on fixed downlink resources.

Prior to initiating access, the UE further needs to obtain other SIBs based on its own features addition to MIB and SIB1 that must be acquired, and then initiates access. For example, if the UE supports multiple RATs, SIB8 further needs to be read to acquire inter-RAT-related cell reselection information; otherwise, SIB8 does not need to be read. If the UE supports WLAN interoperation, SIB17 further needs to be acquired; otherwise, SIB17 does not need to be acquired.

Periodic broadcasting of all system information supported by the eNB helps the UE to acquire the corresponding information at any time. However, the system information needs to be continuously broadcast on specific downlink resources, resulting in low resource utilization and high energy consumption. To this end, the research on 5G technology hopes to avoid unnecessary overheads while meeting the demand of the UE acquiring specific system information.

SUMMARY OF INVENTION

According to one aspect of the present application, a method executed by a user equipment is provided, comprising: receiving a first system information (SI) message, wherein the first system information (SI) message comprises type information related to a system information block (SIB) and scheduling information of a second system information (SI) message to which the type of the SIB belongs, and the scheduling information comprises a time when the second SI message appears and indication information indicating whether the second SI message is broadcast; and if the indication information indicates that the second SI message is not broadcast, sending an SI request message, and receiving a needed system information block (SIB) according to the scheduling information in the received first SI message.

According to another aspect of the present application, a method executed by a base station is provided, comprising: having type information related to a system information block (SIB) and scheduling information of a second system information (SI) message to which the type of the SIB belongs comprised in a first SI message to be sent, wherein the scheduling information comprises a time when the second SI message appears and indication information indicating whether the second SI message is broadcast; and if the indication information indicates that the second SI message is not broadcast, receiving an SI request message and sending the second SI message at a specified scheduling time.

According to another aspect of the present application, a user equipment is provided, comprising: a first receiving unit, configured to receive a first system information (SI) message, wherein the first system information (SI) message comprises type information related to a system information block (SIB) and scheduling information of a second system information (SI) message to which the type of the SIB belongs, and the scheduling information comprises a time when the second SI message appears and indication information indicating whether the second SI message is broadcast; and a second receiving unit, configured to do the following: if the indication information indicates that the second SI message is not broadcast, send an SI request message, and receive a needed system information block (SIB) according to the scheduling information in the received first SI message.

According to another aspect of the present application, a base station is provided, comprising: a generation unit, configured to do the following: have type information related to a system information block (SIB) and scheduling information of a second system information (SI) message to which the type of the SIB belongs comprised in a first SI message to be sent, wherein the scheduling information comprises a time when the second SI message appears and indication information indicating whether the second. SI message is broadcast; and a sending unit, configured to do the following: if the indication information indicates that the second SI message is not broadcast, receive an SI request message and send the second SI message at a specified scheduling time.

By means of the present invention, unnecessary overheads are avoided and system resources are saved while meeting the demand of a UE acquiring specific system information.

BRIEF DESCRIPTION OF DRAWINGS

The above and other features of the present application will become more apparent through the following detailed description made in conjunction with the accompanying drawings, where.

DETAILED DESCRIPTION OF EMBODIMENTS

The principles and implementation of the present application will become apparent below through the description of the specific embodiments of the present application made in conjunction with the accompanying drawings, It should be noted that the present application should not be limited to the specific embodiments described below. In addition, for simplicity, detailed description of the prior art irrelevant to the present application is omitted.

Figure 1:
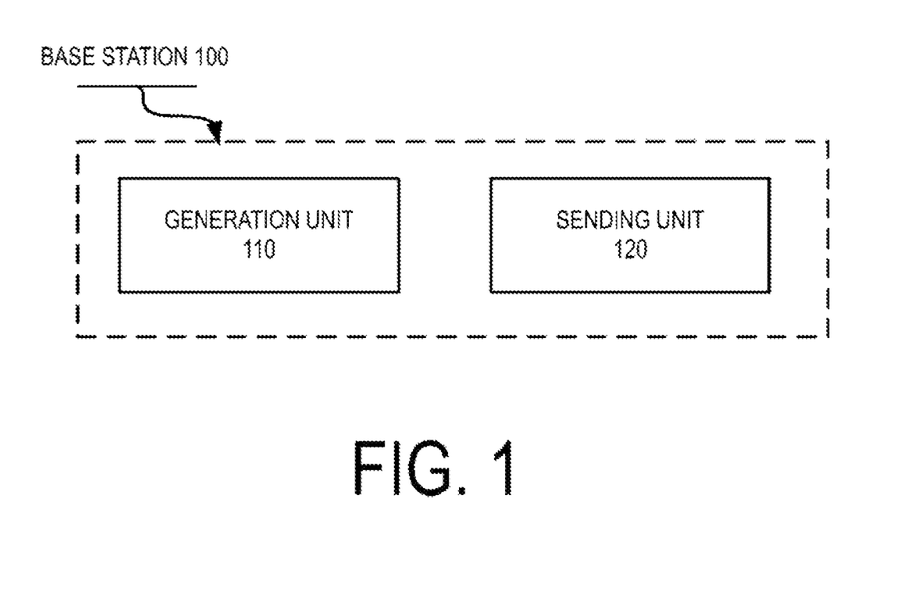
FIG. 1 is a block diagram of base station according to an embodiment of the present application.

FIG. 1 is a block diagram of a base station according to an embodiment of the present application. As shown in FIG. 1, a base station 100 includes a generation unit 110 and a sending unit 120.

The generation unit 110 is configured to include type information related to a system information block (SIB) and scheduling information of a second system information (SI) message to which the type of the SIB belongs in a first SI message to be sent. The scheduling information may include a time when the second SI message appears and indication information indicating whether the second SI message is broadcast or not.

The sending unit 120 is configured to send the first SI message generated by the generation unit 110.

For example, the base station 100 may carry, in the system information needing to be frequently sent (for example, MIB or SIB1), a SIB type sent by the cell and scheduling information of an SI message to which the SIB type belongs. The scheduling information may include a time when the SI message appears. In addition, the scheduling information of each SI message further includes indication information to indicate whether the SI message is broadcast.

The indication information can be expressed in 1 bit. For example, when the indication information is set to 0 (or 1), it represents that the corresponding SI message is broadcast (i.e., the SI message appearing in all scheduling times). On the contrary, when the indication information is set to 1 (or 0), it represents that the corresponding SI message is not broadcast the SI message not appearing in all scheduling times).

Alternatively, the indication information may also have an indication like the one described below: the eNB divides SI messages sent by the cell into two types: one type is to-be-broadcast SI messages, which always appear at a specified scheduling time; the other is SI messages that will not be broadcast, which do not always appear at all scheduling times.

Alternatively, the meaning of the SI messages that will not be broadcast in the indication information may also be replaced with the following: SI messages that can be obtained only when request messages are sent. That is, if the indication information indicates that the second SI message is not broadcast, an SI request message is received by base station first; and then, the generated first SI message is sent by base station at a specified scheduling time.

Alternatively, one SI message may carry one SIB or multiple SIBs, If the SI message carries only one SIB, the SI message can be seen as an equivalent to the SIB.

Figure 2:
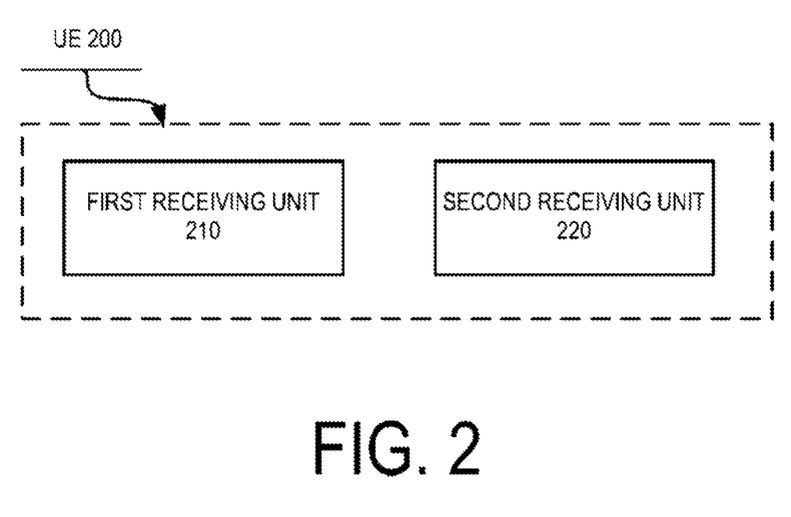
FIG. 2 is a block diagram of a user equipment according to an embodiment of the present application.

FIG. 2 is a block diagram of a user equipment according to an embodiment of the present application. As shown in FIG. 2, a user equipment 200 includes a first receiving unit 210 and a second receiving unit 220.

The first receiving unit 210 is configured to receive a first system information (SI) message. In this embodiment, the first system information (SI) message may include type information related to a system information block (SIB) and scheduling information of a second system information (SI) message to which the type of the SIB belongs. The scheduling information may include a time when the second SI message appears and indication information indicating whether the second SI message is broadcast.

The second receiving unit 220 is configured to do the following: if the indication information indicates that the second SI message is already broadcast, receive the needed system information block (SIB) according to the scheduling information in the received first SI message, For example, the second receiving unit 220 may receive the needed system information block (SIB) in any one of the following manners:

(1) Calculate a location and duration for the appearance of the second SI message according to the scheduling information in the received first SI message. Receive data packets on a corresponding downlink channel in the duration.

(2) Calculate an operation period of a receive timer according to the scheduling information in the received SI message. Receive data packets on a corresponding downlink channel in the operation period of the timer, (3) Start a receive timer according to pre-configured information. Receive data packets on a corresponding downlink channel in the operation period of the timer according to the time indicated in the scheduling information.

Multiple scheduling times may appear in the operation period of the timer. If the UE does not receive the requested SIB (or SI message) at the first scheduling time, the UE may continue the receiving at the second scheduling time. The process continues until the SIB (or SI message) is correctly received. If the timer times out and the SIB is not yet correctly received, the UE can judge that the current link is abnormal; at this time, cell reselection or other mechanisms may need to be started.

Because the SIB to he received by the UE is included in the SI message, the UE may receive the full SI message and then retain the needed SIB and discard other unwanted SIBs in the case when the SI message carries multiple SIBs and the UE only, needs to acquire one therefrom. Or, distribution regions for different SIBs may be pre-defined in the SI message, such that the UE can receive only the part including the SIB without receiving the full SI message.

The second receiving unit 220 may be further configured to do the following: if the indication information indicates that the second SI message is not broadcast, send an SI request message, and receive a needed system information block (SIB) according to the scheduling information in the received first SI message.

In this embodiment, the SI request message may indicate a type for one or more requested SIBs. If the UE only needs to acquire one SIB, the SI request message can indicate a request for this type of SIB, or indicate a request for an SI message to which the requested type of SIB belongs. If the SIBs to be received by the UE have multiple types which are distributed in different SI messages, the SI request message sent by the UE can request one or more SIBs.

Alternatively, the second receiving unit 220 may be configured to send the SI request message once or more than one time. For example, if the UE needs to acquire SIBx and SIBy, and SIBx and SIBy are distributed in different SI messages, the UE may send an SI request message once, requesting the base station to send SIBx and SIBy. Then, the UE receives SIBx and SIBy at scheduling times of SI messages corresponding to SIBx and SIBy. Or, according to the sequence of the scheduling times for the appearance of SIBx and SIBy, the UE may first send SI request message to request the base station to send SIBx and then receive SIBx; next, the UE sends SI request message to request the base station to send SIBy and then receives SIBy.

Alternatively, the second receiving unit 220 may be configured to determine a time for sending the SI request message according to a time distance between a current time and an upcoming scheduling time of a target SIB. The time when the UE sends the SI request message can be determined using the following solution: the UE first determines the current time; and if a long period exists between the current time and the upcoming scheduling time of the target SIB; the latest that the UE can send the SI request message is some time before the scheduling time. For example, the latest can be the time at a length of n subframes before the scheduling time; the value of n can be defined according to the request processing delay of the base station. If the length is less than n subframes, the UE may attempt to perform reception at the scheduling time before sending the SI request message first. If the SIB is requested by other UEs prior to this, the UE is likely to receive the SIB. If the UE does not receive the SIB, the SI request message is sent before the next scheduling time arrives.

Alternatively, the second receiving unit 220 may be configured to send the SI request message on a specified resource. This is because the time when the UE sends the SI request message may also be limited by the resources allowed to send the request message. The base station may specify the resources (for example, including time and frequency resources) for sending the SI request message. Accordingly, the latest that the UE should send the request information is at the time of the available resource closest to the upcoming scheduling time.

After sending the SI request message, the second receiving unit 220 may receive the needed system information block (SIB) in the following manner:

(1) Calculate a location and/or duration for the appearance of the second SI message according to the scheduling information in the received first SI message. Receive data packets in the appearing location and/or duration.

(2) Calculate an operation period of a receive timer according to the scheduling information in the received SI message. Receive data packets on a corresponding downlink channel in the operation period of the timer.

(3) Start a receive timer according to pre-configured information. Receive data packets on a corresponding downlink channel in the operation period of the timer according to the time indicated in the scheduling information.

Multiple scheduling times may appear in the operation period of the timer. If the UE does not receive the requested SIB (or SI message) at the first scheduling time, the UP may continue the receiving at the second scheduling time. The process continues until the SIB (or SI message) is correctly received. If the timer times out and the requested system information is not yet correctly received, the SI request message can be resent after the timer times out.

Because the SIB to be received by the UE is included in the SI message, the system information request message sent by the UE may be a request for the SIB or a request for the corresponding SI message. Accordingly, if the UE requests a SIB, the base station may send an SI message carrying only the SIB at a corresponding time or an SI message carrying the SIB and other SIBs included in the SI message. This is because other SIBs may be requested by other UEs. The UE may receive the full SI message and then retain the needed SIB and discard other unwanted SIBs in the case when the SI message carries multiple SIBs and the UE only needs to acquire one therefrom. Or, distribution regions for different SIBs may be pre-defined in the SI message. In this way, the UE can receive only, the part including the SIB without receiving the full SI message.

By means of the aforementioned embodiments, unnecessary overheads are avoided and system resources are saved while meeting the demand of a UE acquiring information.

Figure 3:
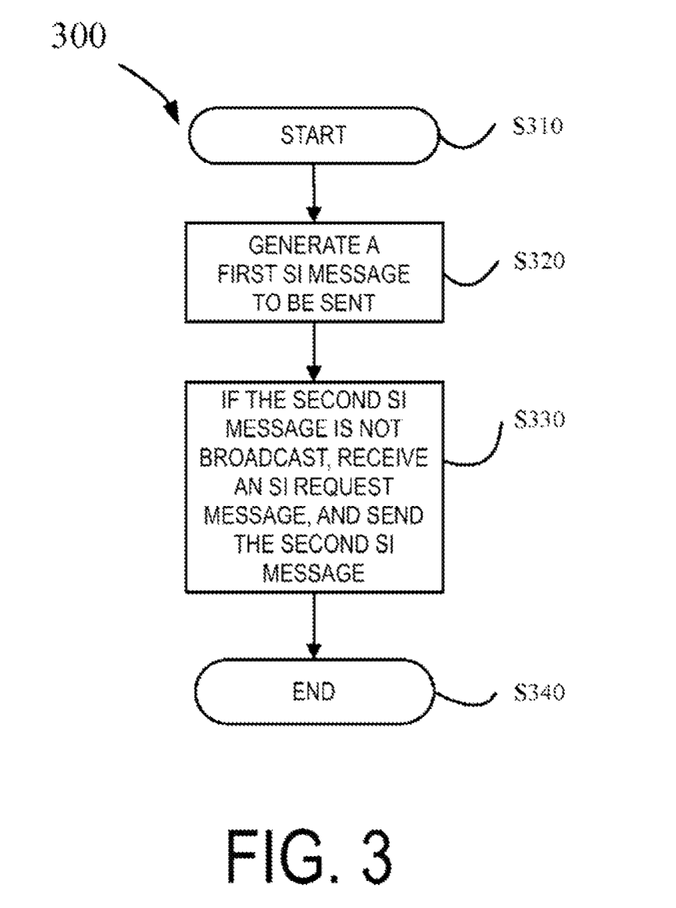
FIG. 3 is a flowchart of a method for sending system information according to an embodiment of the present application.

FIG. 3 is a flowchart of a method for sending system information according to an embodiment of the present application. As shown in FIG. 3, a method 300 starts at step S310

At step S320, type information related to a system information block (SIB) and scheduling information of a second system information (SI) message to which the type of the SIB belongs are included in a first SI message to be sent. The scheduling information includes a time when the second SI message appears and indication information indicating whether the second SI message is broadcast or not.

At step S330, if the indication information indicates that the second SI message is not broadcast, an SI request message is received, and the second SI message is sent at a specified scheduling time.

Then, the method 300 ends at step S340.

Preferably, when the indication information indicates that the SI message is broadcast, the SI message appears at all scheduling times. When the indication information indicates that the SI message is not broadcast, the SI message does not appear at all scheduling times. If the indication information indicates that the second SI message is not broadcast, an SI request message is received first by base station; and the system information block (SIB) is sent according to the scheduling information in the received first SI message by base station.

Figure 4:
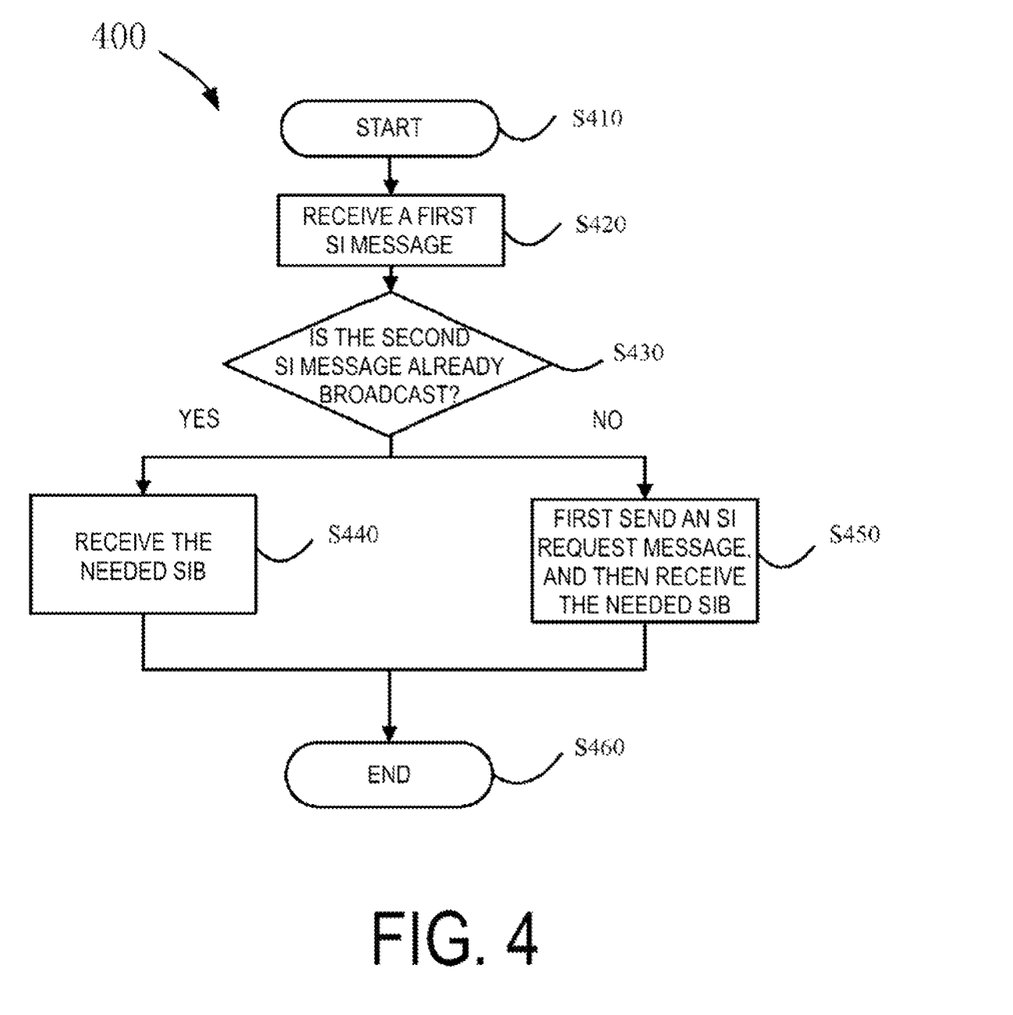
FIG. 4 is a flowchart of a method for receiving system information according to an embodiment of the present application.

FIG. 4 is a flowchart of a method for receiving system information according to an embodiment of the present application. As shown in FIG. 4, a method 400 starts at step S410.

At step S420, a first system information (SI) message is received. The first system information (SI) message includes type information related to a system information block (SIB) and scheduling information of a second system information (SI) message to which the type of the SIB belongs. The scheduling information includes a time when the second SI message appears and indication information indicating whether the second SI message is broadcast or not.

At step S430, it is judged whether the indication information indicates that the SI message is already broadcast. If the indication information indicates that the second SI message is already broadcast, the needed system information block (SIB) is received according to the scheduling information in the received SI message at step S440. Or, if the indication information indicates that the second SI message is not broadcast, an SI request message is sent first at step S450; and then, the required system information block (SI13) is received according to the scheduling information in the received SI message.

Preferably, the receiving the needed system information block (SIB) may include: calculating a location and/or duration for the appearance of the second SI message according to the scheduling information in the received first SI message. Data packets are received on a corresponding downlink channel in the duration.

Preferably, the receiving the required system information block (SIB) may include: calculating an operation period of a receive timer according to the scheduling information in the received first SI message. Data packets are received on a corresponding downlink channel in the operation period of the timer.

Preferably, the receiving the required system information block (SIB) may include: starting a receive timer according to pre-configured information. Data packets are received on a corresponding downlink channel in the operation period of the timer according to the time indicated in the scheduling information.

Preferably, the SI request message indicates a type of one or more requested SIBS. In addition, the SI request message may be sent once or more than one time.

Preferably, a time for sending the SI request message may be determined according to a time distance between a current time and an upcoming scheduling time of a target SIB. Preferably, the SI request message may be sent on a specified resource.

Finally, the method 400 ends at step S460.

It should be understood that the above-described embodiments of the present application may be implemented through software, hardware, or a combination of software and hardware. For example, various components of the apparatus in the above embodiments can be implemented through multiple devices. These devices include, but are not limited to: an analog circuit, a digital circuit, a general-purpose processor, a digital signal processing (DSP) circuit, a programmable processor, an application specific integrated circuit (ASIC), a field programmable gate array (FPGA), a programmable logic device (CPLD)), and the like.

In addition, the embodiments of the present application disclosed herein may be implemented on a computer program product. More specifically, the computer program product is a product provided with a computer-readable medium having computer program logic encoded thereon. When being executed on a computing device, the computer program logic provides related operations to implement the above-described technical solutions of the present application. The computer program logic enables a processor to perform the operations (methods) described in the embodiments of the present application when the product is executed on at least one processor of a computing system. Such an arrangement of the present application is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared databases and so on in one or more modules. Software or firmware or such configuration may be installed on a computing device such that one or more processors in the computing device perform the technical solutions described in the embodiments of the present application.

The program running on the device according to the present invention may be a program that enables the computer to implement the functions of the embodiments of the present invention by controlling the central processing unit (CPU). The program or information processed by the program can be stored temporarily in volatile memory (e.g., random access memory RAM), hard disk drive (HDD), non-volatile memory (e.g., flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or more embodiments of the present invention may also be implemented using these new integrated circuit technologies.

Furthermore, the present invention is not limited to the embodiments described above. Although various examples of the described embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments, and the present invention also includes any design modifications that do not depart from the main idea of the present invention. In addition, various modifications can be made to the present invention within the scope of the claims, and embodiments resulting from the appropriate combination of the technical means disclosed in different embodiments are also included within the technical scope of the present invention. In addition, components with the same effect described in the above embodiments may be replaced with one another.

The invention claimed is:

1. A communication method used for a terminal apparatus, the communication method comprising:
   receiving, from a base station, a system information block (SIB) 1 (SIB1) via broadcast, the SIB1 including:
      first information indicating one or more SIBs other than SIB1 provided in a first system information (SI) message and one or more SIBs other than SIB1 provided in a second SI message, the first SI message being different from the second SI message,
      second information for determining a first plurality of scheduling times for receiving the first SI message and for determining a second plurality of scheduling times for receiving the second SI message, the first plurality of scheduling times being different from the second plurality of scheduling times, and
      third information indicating that the first SI message is broadcast by the base station and the second SI message is not broadcast by the base station;
   in a case that the UE requires system information included in the first SI message, receiving the first SI message based on the second information; and
   in a case that the UE requires system information included in the second SI message:
      transmitting an SI request through signaling to the base station, the signaling being transmitted to the based station on a dedicated resource configured by the base station,
      calculating, based on the second information, the second plurality of scheduling times for receiving the second SI message, the second plurality of scheduling times comprising a current scheduling time and a set of subsequent scheduling times, and
      performing the following actions iteratively within a threshold amount of time until the second SI message is received:
         determining whether the second SI message is received within the current scheduling time, and
         if the second SI message is not received within the current scheduling time, changing the current scheduling time to a subsequent scheduling time in the set of subsequent scheduling times.

2. The communication method according to claim 1, wherein the SI request signaling includes information related to a plurality of SI messages, including the second SI message, requested by the terminal apparatus.

3. A communication method used for a base station apparatus, the communication method comprising:
   transmitting, to a user equipment (UE), a system information block (SIB) 1 (SIB1) via broadcast, the SIB1 including:
      first information indicating one or more SIBs other than SIB1 provided in a first system information (SI) message and one or more SIBs other than SIB1 provided in a second SI message, the first SI message being different from the second SI message,
      second information for determining a first plurality of scheduling times for transmitting the first SI message and for determining a second plurality of scheduling times for transmitting the second SI message, the first plurality of scheduling times being different from the second plurality of scheduling times, and
      third information indicating that the first SI message is broadcast by the base station and the second SI message is not broadcast by the base station;
   in a case that the UE requires system information included in the first SI message, the UE receives the first SI message based on the second information; and
   in a case that the UE requires system information included in the second SI message:
      receiving an SI request through signaling from the UE, the signaling being transmitted to the base station on a dedicated resource configured by the base station apparatus,
      determining, based on the second information, the second plurality of scheduling times for transmitting the second SI message, the second plurality of scheduling times comprising a current scheduling time and a set of subsequent scheduling times, and
      transmitting the second SI message within each of the second plurality of scheduling times, wherein the UE performs the following actions iteratively within a threshold amount of time until the second SI message is received by the UE:
         determine whether the second SI message is received within the current scheduling time, and
         if the second SI message is not received within the current scheduling time, change the current scheduling time to a subsequent scheduling time in the set of subsequent scheduling times.

4. The communication method according to claim 3, wherein the SI request signaling includes information related to a plurality of SI messages, including the second SI message, requested by the UE.

5. A terminal apparatus for performing a communication method, the terminal apparatus comprising:
   one or more non-transitory computer-readable media storing one or more instructions; and
   at least one processor coupled to the one or more non-transitory computer-readable media and configured to execute the one or more instructions to:
   receive, from a base station, a system information block (SIB) 1 (SIB1) via broadcast, the SIB1 including:
      first information indicating one or more SIBs other than SIB1 provided in a first system information (SI) message and one or more SIBs other than SIB1 provided in a second SI message, the first SI message being different from the second SI message,
      second information for determining a first plurality of scheduling times for receiving the first SI message and for determining a second plurality of scheduling times for receiving the second SI message, the first plurality of scheduling times being different from the second plurality of scheduling times, and
      third information indicating that the first SI message is broadcast by the base station and the second SI message is not broadcast by the base station;
   in a case that the UE requires system information included in the first SI message, receive the first SI message based on the second information; and in a case that the UE requires system information included in the second SI message:
  transmit an SI request through signaling to the base station, the signaling being transmitted to the based station on a dedicated resource configured by the base station,
  calculate, based on the second information, the second plurality of scheduling times for receiving the second SI message, the second plurality of scheduling times comprising a current scheduling time and a set of subsequent scheduling times, and
  perform the following actions iteratively within a threshold amount of time until the second SI message is received:
    determine whether the second SI message is received within the current scheduling time, and
    if the second SI message is not received within the current scheduling time, change the current scheduling time to a subsequent scheduling time in the set of subsequent scheduling times.

6. The terminal apparatus according to claim 5, wherein the SI request signaling includes information related to a plurality of SI messages, including the second SI message, requested by the terminal apparatus.

7. A base station apparatus for performing a communication method, the base station apparatus comprising:
  one or more non-transitory computer-readable media storing one or more instructions; and
  at least one processor coupled to the one or more non-transitory computer-readable media and configured to execute the one or more instructions to:
  transmit, to a user equipment (UE), a system information block (SIB) 1 (SIB1) via broadcast, the SIB1 including:
    first information indicating one or more SIBs other than SIB1 provided in a first system information (SI) message and one or more SIBs other than SIB1 provided in a second SI message, the first SI message being different from the second SI message,
    second information for determining a first plurality of scheduling times for transmitting the first SI message and for determining a second plurality of scheduling times for transmitting the second SI message, the first plurality of scheduling times being different from the second plurality of scheduling times, and
    third information indicating that the first SI message is broadcast by the base station and the second SI message is not broadcast by the base station;
  in a case that the UE requires system information included in the first SI message, the UE receives the first SI message based on the second information; and
  in a case that the UE requires system information included in the second SI message:
    receive an SI request through signaling from the UE, the signaling being transmitted to the base station on a dedicated resource configured by the base station apparatus,
    determine, based on the second information, the second plurality of scheduling times for transmitting the second SI message, the second plurality of scheduling times comprising a current scheduling time and a set of subsequent scheduling times, and
    transmit the second SI message within each of the second plurality of scheduling times, wherein the UE performs the following actions iteratively within a threshold amount of time until the second SI message is received by the UE:
      determine whether the second SI message is received within the current scheduling time, and
      if the second SI message is not received within the current scheduling time, change the current scheduling time to a subsequent scheduling time in the set of subsequent scheduling times.

8. The base station apparatus according to claim 7, wherein the SI request signaling includes information related to a plurality of SI messages, including the second SI message, requested by the UE.

* * * * *